Figure 1:
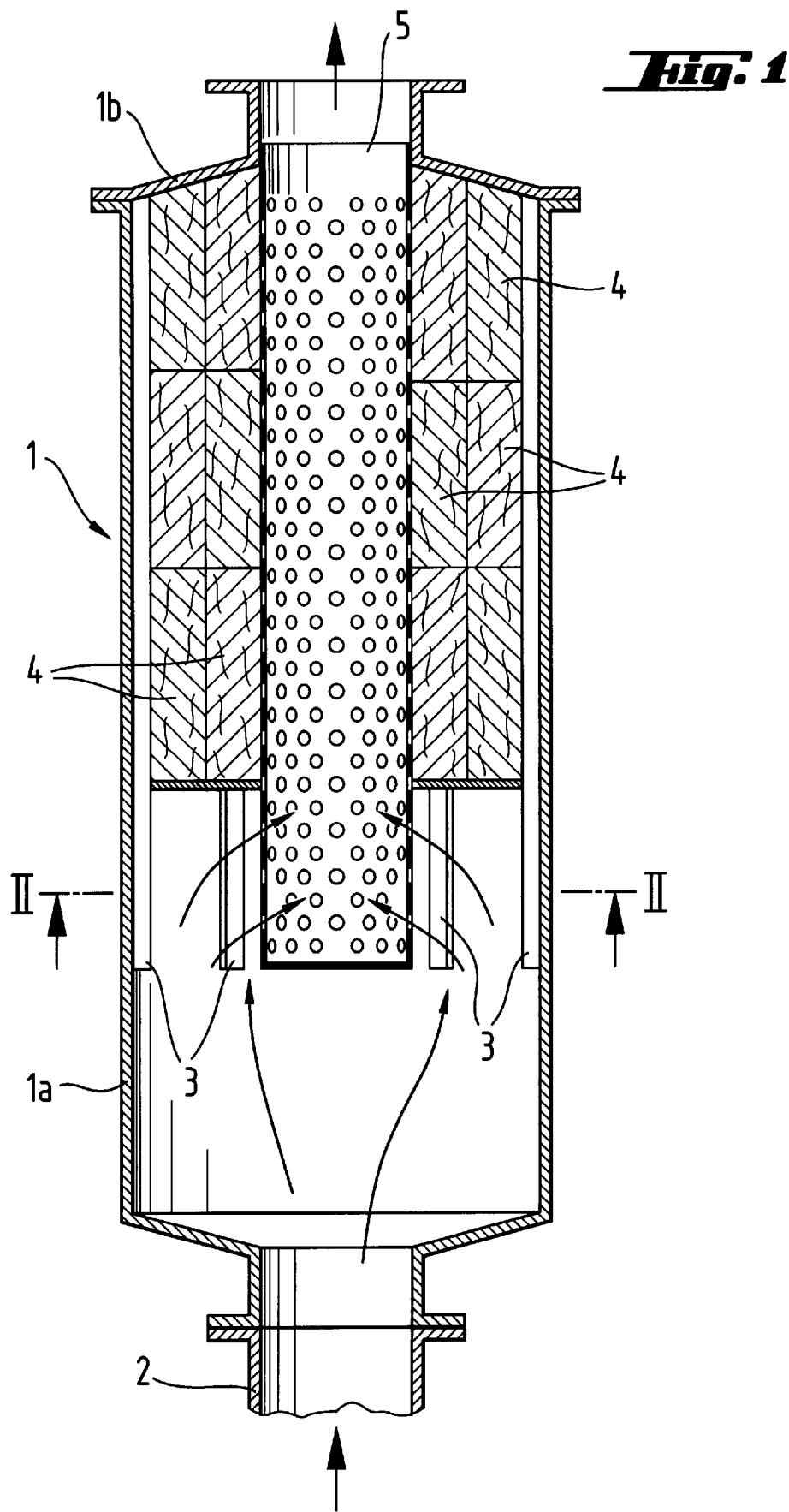

United States Patent [19]
Svahn

[11] Patent Number: 5,832,720
[45] Date of Patent: Nov. 10, 1998

[54] METHOD FOR UTILIZING A SILENCER UNIT AND AN ARRANGEMENT FOR APPLYING THE METHOD IN A LARGE DIESEL ENGINE

[75] Inventor: Peter Svahn, Vaasa, Finland

[73] Assignee: Wartsila Diesel International Ltd Oy, Helsinki, Finland

[21] Appl. No.: 705,686

[22] Filed: Aug. 29, 1996

Related U.S. Application Data

[63] Continuation of Ser. No. 457,008, May 31, 1995, abandoned.

[30] Foreign Application Priority Data

Jul. 1, 1994 [FI] Finland .................................... 943157

[51] Int. Cl.[6] ...................................................... F01N 3/20
[52] U.S. Cl. ................................. 60/274; 29/890; 60/299; 60/301
[58] Field of Search ............................ 60/301, 299, 274; 29/890

[56] References Cited

U.S. PATENT DOCUMENTS

| | | |
|---|---|---|
| 2,705,541 | 4/1955 | Finch . |
| 3,109,511 | 11/1963 | Slayter et al. . |
| 3,495,950 | 2/1970 | Barber et al. . |
| 3,556,735 | 1/1971 | Epelman . |
| 4,113,051 | 9/1978 | Moller . |
| 4,239,091 | 12/1980 | Negrao . |
| 4,674,594 | 6/1987 | Jensen . |
| 4,843,815 | 7/1989 | Smojver . |
| 4,900,517 | 2/1990 | Domesle .................................. 60/301 |
| 5,036,585 | 8/1991 | Schweinfurth . |
| 5,209,062 | 5/1993 | Vollenweider . |
| 5,378,435 | 1/1995 | Gavoni . |
| 5,387,399 | 2/1995 | Nishida et al. . |
| 5,434,374 | 7/1995 | Hsueh . |
| 5,452,577 | 9/1995 | Langer ...................................... 20/299 |
| 5,609,026 | 3/1997 | Berriman .................................. 60/301 |

FOREIGN PATENT DOCUMENTS 43 10 961   3/1994   Germany .

*Primary Examiner*—Douglas Hart
*Attorney, Agent, or Firm*—Smith-Hill and Bedell

[57] ABSTRACT

A method for utilizing a silencer unit attached to an exhaust tube in a large diesel engine, and an exhaust gas system for applying the method in practice, in which the silencer unit includes a substantially hollow, preferably cylinder formed body member, inside of which a set of sound silencing porous elements can be fitted, said elements including a flow channel for the exhaust gases and being arranged in successive order in the flow direction of the exhaust gases longitudinally of the body member so that the exhaust gases are led through the flow channel of each element one after the other. Said elements are installed inside the body member in the axial direction from one end thereof one at a time and are supported to the inner mantle surface of the body member. In the flow direction upstream of the body member the exhaust tube is provided with means for feeding a medium containing ammonium, urea or the like reagent applicable for catalytic depuration into the exhaust gases. In addition at least one of the said elements in the body member is selected so that in a cross-sectional plane of the body member it covers the whole flow area of the exhaust gases and provides an exhaust gases depurating, catalytic reaction especially for decreasing the NOx-content of the exhaust gases.

23 Claims, 6 Drawing Sheets

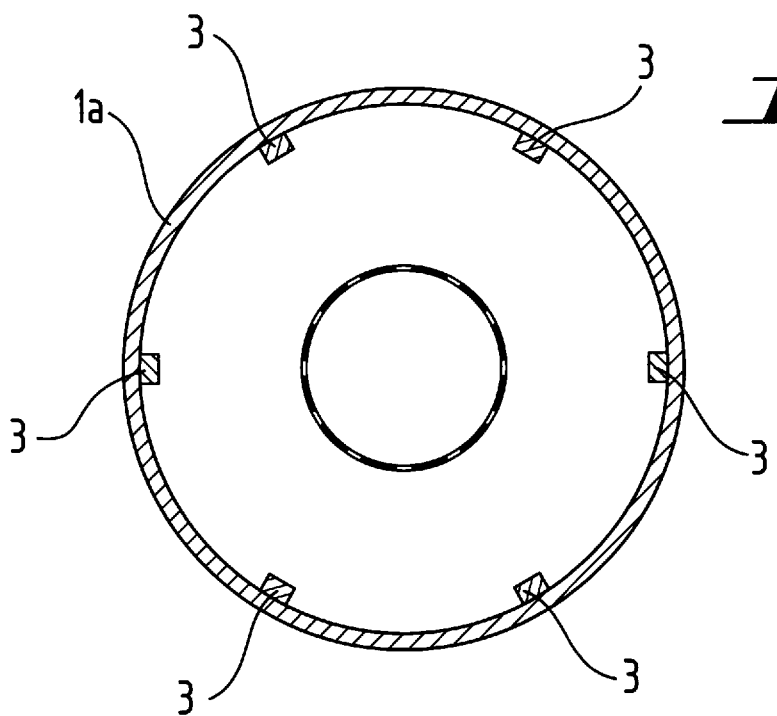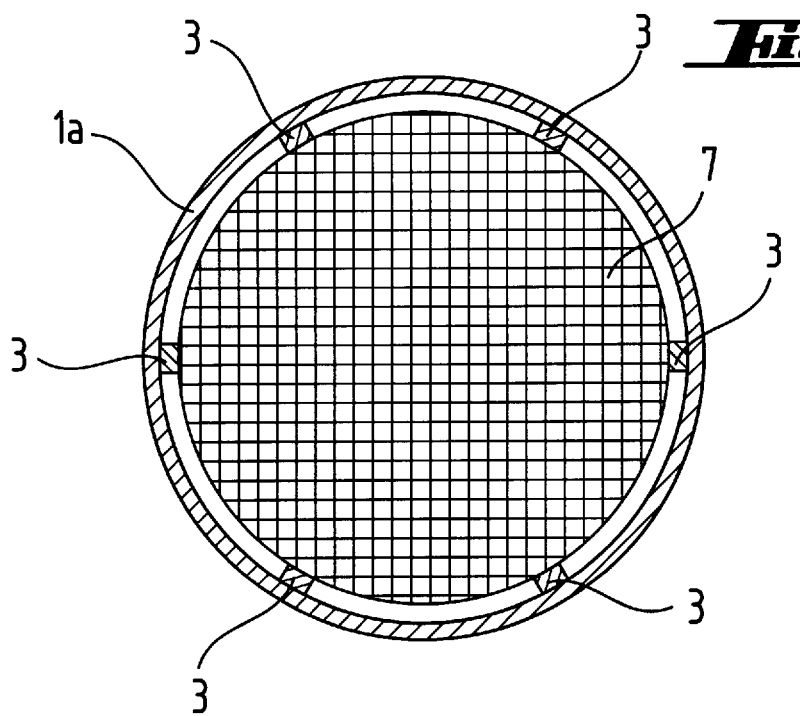

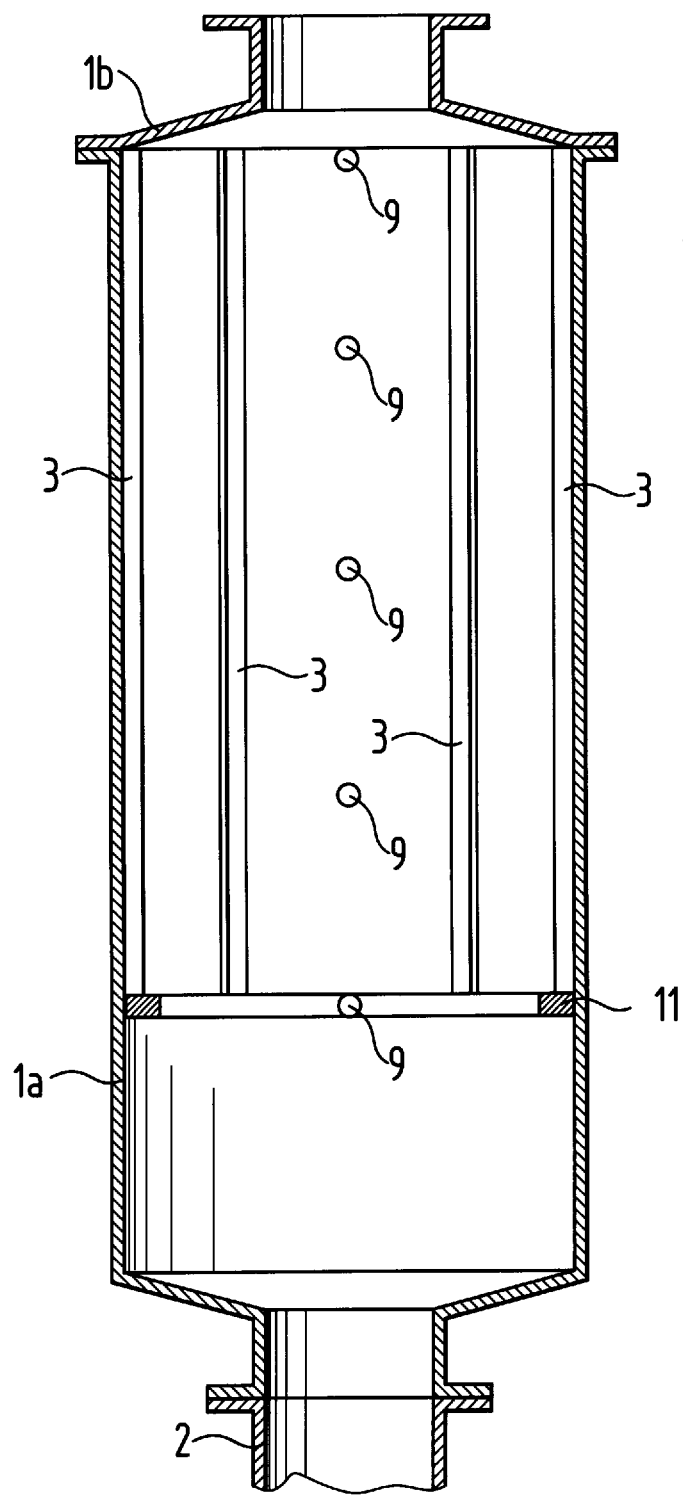

METHOD FOR UTILIZING A SILENCER UNIT AND AN ARRANGEMENT FOR APPLYING THE METHOD IN A LARGE DIESEL ENGINE

CROSS-REFERENCE TO RELATED APPLICATION

This application is filed as a continuation of patent application Ser. No. 08/457,008, filed May 31, 1995 now abandoned.

The invention relates to a method for utilizing a silencer unit attached to an exhaust tube in a large diesel engine, and to an exhaust gas system for applying the method in practice.

Large diesel engines refer here to such engines, which may be applied for example for main or auxiliary engines in ships or for power plants for production of heat and/or electricity.

In diesel engines, conventionally, some kind of a silencer to be connected to an exhaust tube is used for decreasing the noise caused by the engine. In many countries the environmental norms have become more strict and caused a need for also depuration of exhaust gases. Depending on the fuel to be used measures have been taken especially for decreasing the NOx-content of the exhaust gases. Perhaps the best solution to the NOx problem is the so called SCR (=selective catalytic reduction) process, which is based on reducing of the nitrogen oxides by means of ammonia. The supplied ammonia may then be in liquid form or under pressure without water and for instance under normal atmospheric pressure as a water solution including 25% ammonia. Also urea can be used for the purpose.

In practice noise reduction and depuration of exhaust gases is conventionally arranged so that the exhaust gases are led in succession through a silencer and a separate SCR unit. This leads to an expensive and space requiring construction causing problems especially when a depuration arrangement is to be installed afterwards in an engine located in a narrow space.

To some degree it has also been understood to combine these functions. As an example could serve the solution disclosed in the publication WO 93/24744 in which two stationary silencer units are built in a uniform housing and between them is arranged a separate element providing catalytic deputation of the exhaust gases. This solution is rather complicated as to its construction and stationary, so it cannot be easily modified for different needs for depuration of the exhaust gases.

An aim of the invention is to provide such a new solution that on the one hand makes it possible to achieve sound silencing and on the other hand can be modified in a simple way in view of different needs for depuration of the exhaust gases. An aim is especially that the modifying can with ease be accomplished also afterwards in accordance with subsequently appearing needs for depuration of exhaust gases. A further aim is to provide a solution with an uncomplicated construction and advantageous as to the costs and the space requirement of which is as small as possible.

The invention relates on the one hand to a method for utilizing a silencer unit in a case where, in addition to sound silencing, there appears a need for also depuration of the exhaust gases. Then in accordance with the invention the sound silencing elements are installed inside the body member in the axial direction from one end thereof one at a time, and are supported to the inner mantle surface of the body member. In the flow direction upstream of the body member the exhaust tube is provided with means for feeding a medium containing ammonia, urea or the like reagent applicable for catalytic depuration into the exhaust gases. In addition at least one of the said elements in the body member is selected so that in a cross-sectional plane of the body member it covers the whole flow area of the exhaust gases and provides an exhaust gases depurating, catalytic reaction especially for decreasing the NOx-content of the exhaust gases.

So the invention is based on the comprehension that also an SCR element for depurating exhaust gases has a substantial sound silencing property, whereby, when depurating needs appear, conventional sound silencing elements can easily be replaced by exhaust depurating elements without increased need for space or weakened sound silencing. Then at increased depurating requirements for the exhaust gases several, preferably all of the original sound silencing elements are replaced by catalytically depurating elements.

On the other hand the invention relates also to an exhaust gas system in a large diesel engine for applying in practice the method and the basic comprehension described above. The system includes a silencer unit to be connected to an exhaust tube of the engine and comprising a hollow body member, which is on its inner mantle surface provided with bar-like guiding and support members, to which the sound silencing elements can be supported so that the elements can be installed one at a time one after the other from one end of the body member axially to its place and away from its place for replacement. The said elements included in the system include on the one hand sound silencing elements having no essential effect on the composition of the exhaust gases and on the other hand elements applicable for catalytic depuration of the exhaust gases. In case depuration of the exhaust gases is needed the exhaust tube is provided, in the flow direction upstream of the body member, with means for feeding a medium containing ammonia, urea or the like reagent applicable for catalytic depuration into the exhaust gases and in addition at least one of said elements in the body member is selected from said catalytically depurating elements so that it provides an exhaust gases depurating, catalytic reaction especially for decreasing the NOx-content of the exhaust gases. Thus, by providing the body member and the elements with a construction and a support in accordance with the invention the elements can be selected according to need in each case. In addition they can easily be mutually changed and replaced also afterwards as a subsequent installation so that at increased depurating requirements for the exhaust gases several, preferably all of the essentially only sound silencing elements are arranged to be replaced by said catalytically depurating elements.

The body member may be cylinder formed, which is of advantage in view of the construction thereof and effective treatment of the exhaust gas flow.

The sound silencing elements of the system that do not essentially affect depuration of the exhaust gases include a flow channel for the exhaust gases. Further the body member is provided with a flame arrester known as such, located in the flow direction upstream of said elements so that it covers said flow channel. The flame arrester can be implemented in many different ways and it can be arranged also to be a part of the first sound silencing element in the flow direction.

The catalytically depurating elements for their part cover in the cross-sectional plane of the body member the whole flow area of the exhaust gases. In addition they are arranged at a small distance from each other. Then the body member, correspondingly, is provided with a set of apertures going through the mantle thereof and being arranged to open between the catalytically depurating elements so that compressed air can be fed through the apertures for accomplishing purification of the elements, because soot, dust and other impurities are accumulating on the honeycomb structures of the catalytically depurating elements during operation decreasing the depurating process when depositing to layers. Correspondingly it is feasible that some of said apertures are availed of for suction of said impurities removed by compressed air away from the body member.

Figure 1A:
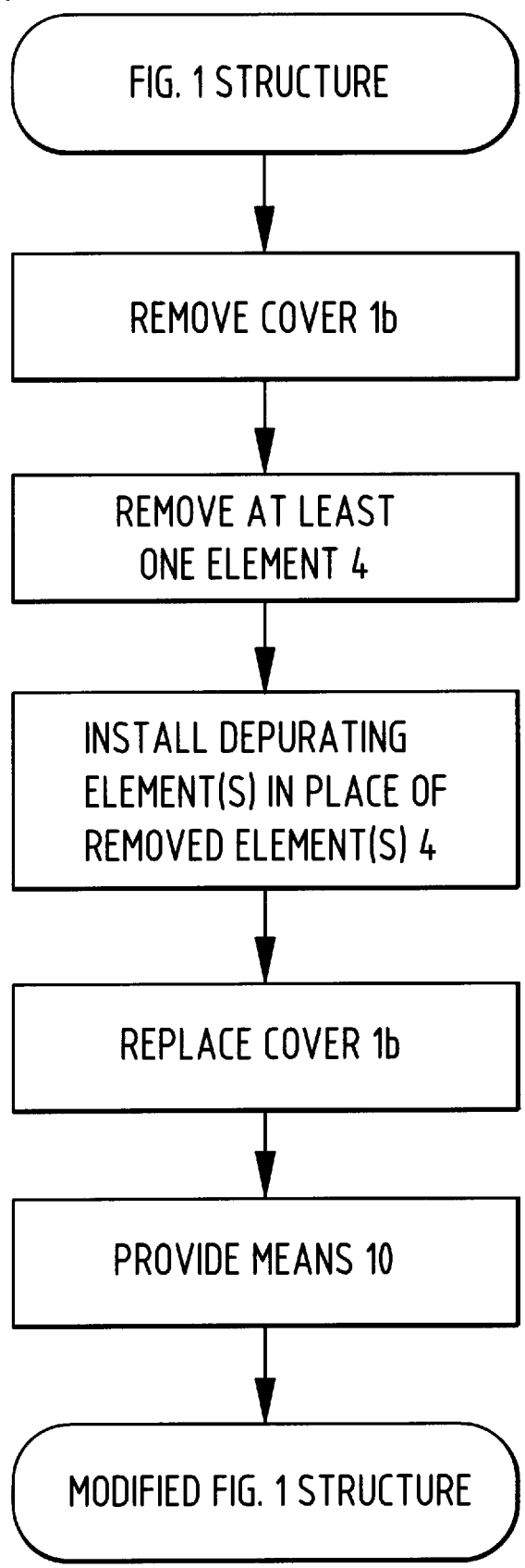
Figure 4:
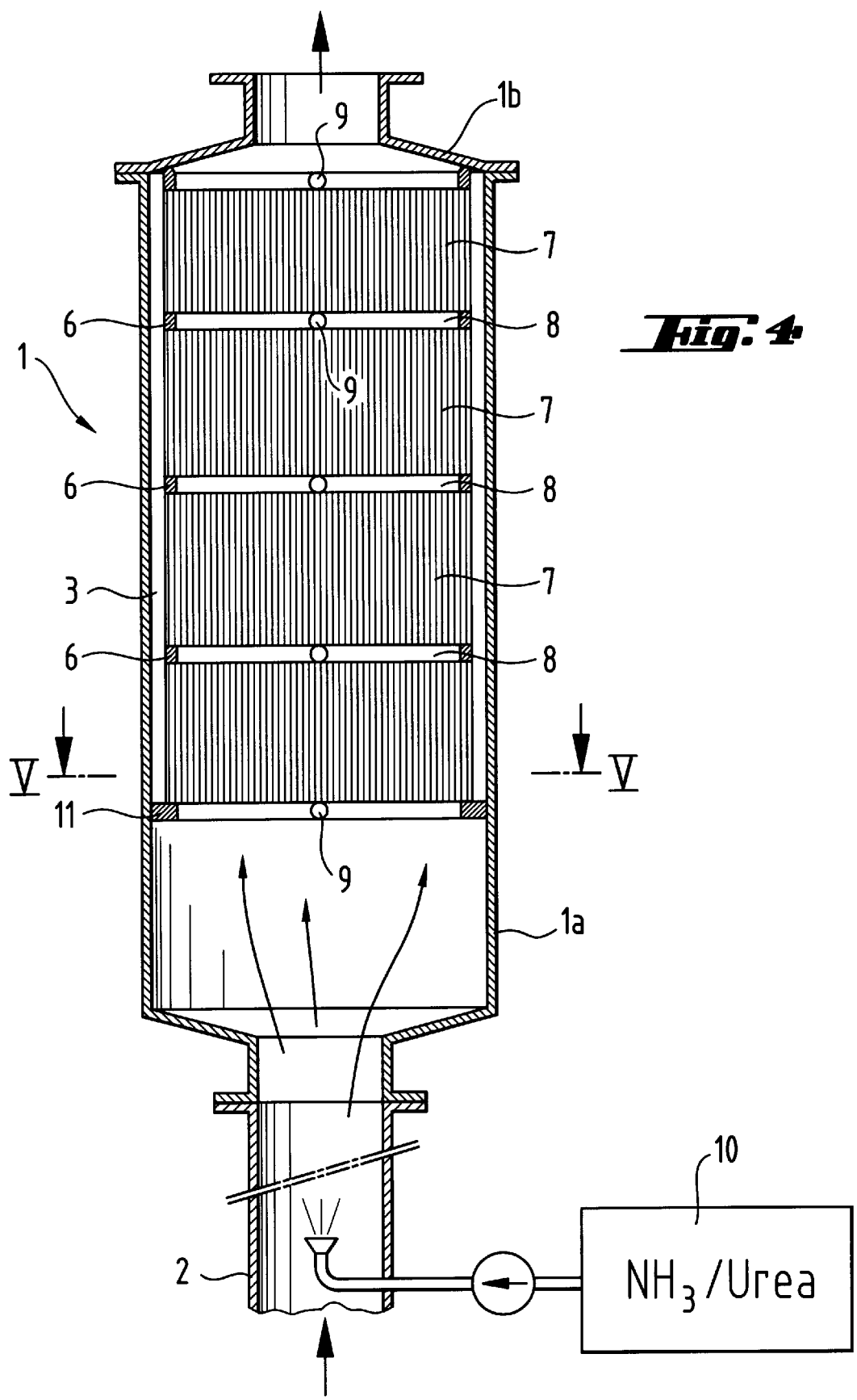
Figure 4A:
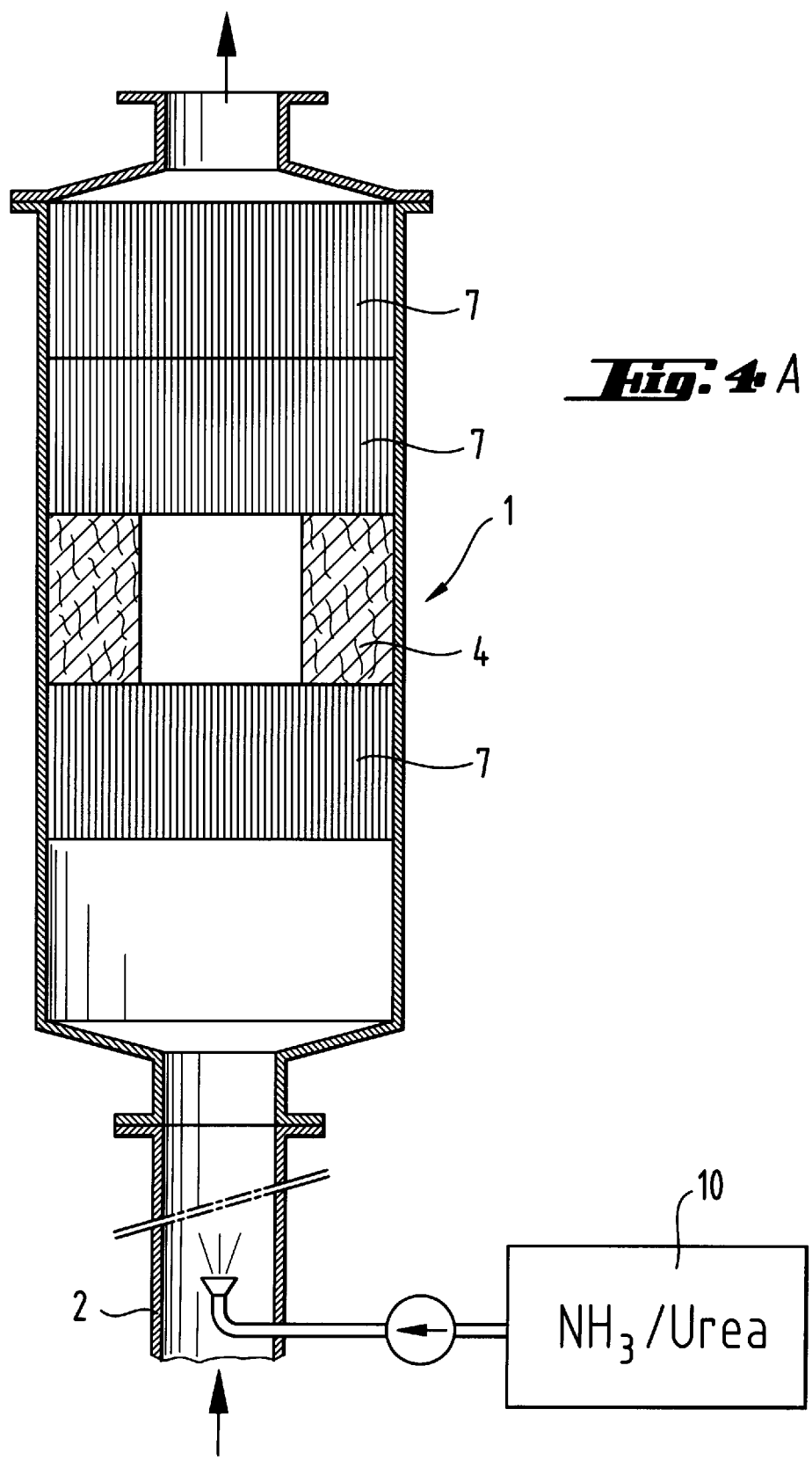

In the following the invention will be described, by way of example, with reference to the accompanying drawings, in which FIG. 1 shows a sectional view of a silencer unit according to the invention, with a set of sound silencing elements inside, FIG. 1A is a flow chart illustrating a method of modifying the silencer unit described with reference to FIG. 1, FIG. 2 shows section II—II of FIG. 1, FIG. 3 shows the silencer unit of FIG. 1 exclusive of the sound silencing elements, FIG. 4 shows a sectional view of the silencer unit of FIG. 1, which is modified for depuration of exhaust gases so that the sound silencing elements in FIG. 1 have been replaced by exhaust gas depurating elements and by providing the exhaust tube with feeding means for ammonia or urea, FIG. 4A shows a sectional view of the silencer unit of FIG. 1, which is partially modified for depuration of exhaust gases so that some of the sound silencing elements in FIG. 1 have been replaced by exhaust gas depurating elements, FIG. 5 shows section V—V of FIG. 4.

In the drawings 1 indicates a silencer unit to be attached to an exhaust tube 2 of a large diesel engine and including a hollow body member 1a and a detachable cover element 1b. The inner surface of the body member 1a has bar-like guiding and support members 3. The body member 1a encloses a set of sound silencing elements 4 or 7, which are supported to the inner mantle surface of the body member 1a by making use of the guiding and support members 3. Exhaust gas flow is shown in the figures by arrows.

Within the scope of the exhaust gas system according the invention the silencer unit 1 can be provided with sound silencing elements 4, as shown in FIG. 1, including a flow channel 5 for the exhaust gases and not essentially affecting the depuration of the exhaust gases. Thus, they provide a sound silencing solution advantageous as to the costs for engine applications, in which depuration of the exhaust gases is not a necessity. In this embodiment the lower part of the perforated duct associated with the flow channels 5 together with the closed end thereof serve as a flame arresting element for preventing the exhaust gases from entering directly into the flow channels 5. The duct can easily be removed at the same time as the sound silencing elements are removed.

By removing the cover 1b the sound silencing elements 4 can easily be drawn out from the end of the body member 1a for instance for service or for replacing. If, however, there is a need for providing also depuration of the exhaust gases, especially for decreasing the NOx-content of the exhaust gases, the elements 4 can be replaced by exhaust gas depurating elements 7, which are with advantage so called SCR elements. This case is illustrated by FIG. 4. Thereby, in the flow direction upstream of the body member 1a the exhaust tube 2 is provided with means 10 for feeding a medium containing ammonia, urea or the like reagent applicable for catalytic depuration into the exhaust gases. Hence, the changed need for depuration of the exhaust gases can in a simple way be taken account of by reequipping the silencer unit 1 within the scope of the system according to the invention but without compromising, however, the aims for sound silencing. Feeding of the reagent can in practice take place also from quite a distance, e.g. several meters, from the silencer unit 1.

As seen in FIGS. 3 and 4 a ring element 11 can be arranged at the lower part of the body member 1a to prevent the exhaust gases from entering the empty spaces (cf. FIG. 5) between the exhaust gas depurating elements 7 and the body member 1a. At the same time the ring element 11 supports the elements 7 in the axial direction.

The exhaust gas depurating elements 7 are arranged so that a small slot 8 is left therebetween. Spacer rings 6 can be used for the purpose of keeping the elements 7 apart from each other. The body member 1a is provided with a set of apertures 9 penetrating the mantle thereof and arranged to open between the catalytically depurating elements 7 so that compressed air can be fed therethrough for removing impurities depositing on the elements 7 during the operation of the engine. Then some of said apertures, for instance the apertures on the opposite side of the body member 1a, can with advantage be availed of for suction of said impurities removed by compressed air away from the body member 1a.

FIG. 4A is similar to FIG. 4 except that one non-depurating sound silencing element has been retained.

It is clear the body member 1a does not have to be cylindrical, but other forms, for instance a body member with a square formed cross section, would do as well depending on the possible practical problems set by the manufacturing technique for the form of the catalytically depurating elements 7.

The invention is not limited to the embodiments shown but several modifications are feasible within the scope of the attached claims.

What is claimed is:

1. A method for utilizing a silencer unit attached to an exhaust tube of a large diesel engine, said silencer unit including a substantially hollow body member having an inner mantle surface that bounds an interior space, the body member having an exhaust gas inlet and an exhaust gas outlet, whereby exhaust gas is able to flow through the interior space of the hollow body member in a flow direction from the exhaust gas inlet to the exhaust gas outlet, said method comprising:

providing a plurality of porous sound silencing elements, wherein at least one of said sound silencing elements is suitable for catalytic depuration of the exhaust gas by reaction with a catalytic depuration reagent and is sized and shaped to extend over substantially the entire cross-sectional area of the interior space when it is installed in the interior space of the hollow body member, whereby exhaust gas that flows through the hollow body member from the exhaust gas inlet to the exhaust gas outlet when said one sound silencing element is so installed passes through said one sound silencing element, providing the exhaust tube of the engine with means for feeding said catalytic depuration reagent into the exhaust gas upstream of the silencer unit, and installing the sound silencing elements in the interior space of the hollow body member so that they are supported relative to the hollow body member and are arranged in successive order in said flow direction.

2. A method according to claim 1, wherein the step of providing the sound silencing elements includes providing at least one sound silencing element that is a non-depurating sound silencing element having no substantial effect on composition of the exhaust gas, and each non-depurating element defines a flow channel for exhaust gas, whereby the sound silencing elements installed in the interior space of the hollow body member include both a non-depurating sound silencing element and a depurating sound silencing element.

3. A method according to claim 1, wherein each of said sound silencing elements is suitable for catalytic depuration of the exhaust gas by reaction with said catalytic depuration agent and extends over substantially the entire cross-sectional area of the interior space, whereby exhaust gas that flows through the hollow body member from the exhaust gas inlet to the exhaust gas outlet passes through said sound silencing elements consecutively.

4. A method according to claim 1, wherein the means for feeding the catalytic depuration agent comprise means for feeding a medium containing ammonia or urea into the exhaust gas.

5. A method according to claim 1, wherein the means for feeding the catalytic depuration agent comprise means for feeding a reagent that reacts with the exhaust gas to reduce the NOx content of the exhaust gas.

6. A method according to claim 1, wherein at least two successive sound silencing elements are catalytic depurating elements and the body member is formed with apertures between two successive depurating elements, and the method further comprises feeding compressed air through the apertures for removing impurities deposited on the depurating elements during the operation of the engine.

7. A method according to claim 6, wherein the body member is formed with additional apertures and the method further comprising removing impurities by suction through the additional apertures.

8. A method for modifying a silencer unit attached to an exhaust tube of a large diesel engine, said silencer unit including a substantially hollow body member having an inner mantle surface that bounds an interior space, the body member having an exhaust gas inlet and an exhaust gas outlet, whereby exhaust gas is able to flow through the interior space of the hollow body member in a flow direction from the exhaust gas inlet to the exhaust gas outlet, and a plurality of sound silencing elements located in the interior space of the hollow body member in successive order in said flow direction, and wherein at least one of said sound silencing elements is a non-depurating sound silencing element that has no substantial effect on composition of the exhaust gas and defines a flow channel for exhaust gas and said method comprises:

providing the exhaust tube of the engine with means for feeding a catalytic depuration reagent into the exhaust gas upstream of the silencer unit, removing said non-depurating sound silencing element from the interior space of the hollow body, and installing a replacement sound silencing element in the interior space of the hollow body in place of said one sound silencing element, and wherein the replacement sound silencing element is supported relative to the hollow body member and extends over substantially the entire cross-sectional area of the interior space, whereby exhaust gas that flows through the hollow body member from the exhaust gas inlet to the exhaust gas outlet passes through said replacement sound silencing element, and said replacement sound silencing element is suitable for catalytic depuration of the exhaust gas by reaction with said catalytic depuration reagent.

9. A method according to claim 8, wherein several of the sound silencing elements located in the interior space of the hollow body member are non-depurating sound silencing elements and the method comprises removing at least two of said non-depurating sound silencing elements from the interior space of the hollow body and installing replacement sound silencing elements suitable for catalytic deputation of the exhaust gas by reaction with said catalytic depuration agent.

10. A method according to claim 9, comprising removing all of said non-depurating sound silencing elements from the interior space of the hollow body and installing replacement sound silencing elements suitable for catalytic depuration of the exhaust gas in the interior space of the hollow body in place of the non-depurating sound silencing elements.

11. A large diesel engine having an exhaust gas system that includes a silencer unit connected to an exhaust tube of the engine, the silencer unit comprising a hollow body member having an inner mantle surface that bounds an interior space, the body member having an exhaust gas inlet and an exhaust gas outlet, whereby exhaust gas is able to flow through the interior space of the hollow body member in a flow direction from the exhaust gas inlet to the exhaust gas outlet, and a plurality of sound silencing elements that can be installed in the interior space of the hollow body member, the hollow body member being provided with bar-like guiding and support members at its inner mantle surface for supporting the sound silencing elements relative to the hollow body member so that the sound silencing elements can be installed in the interior space and removed from the interior space one at a time and one after another by way of an end of the hollow body member, and the exhaust gas system also includes means for feeding a catalytic depuration agent into the exhaust tube upstream of the silencer unit, and wherein the sound silencing elements include non-depurating elements that, when installed in said interior space, have no substantial effect on composition of the exhaust gas and sound silencing elements suitable for catalytic depuration of exhaust gas, whereby for depuration of the exhaust gas at least one depurating sound silencing element is installed in the interior space of the hollow body member and said catalytic depuration reagent is fed into the exhaust tube.

12. A diesel engine according to claim 11, wherein the deputation reagent is a reagent that reacts with the exhaust gas to reduce the NOx content of the exhaust gas.

13. A diesel engine according to claim 11, wherein the body member is substantially cylindrical and has first and second opposite ends, and the exhaust gas inlet is at the first end of the body member and the exhaust gas outlet is at the second end of the body member.

14. A diesel engine according to claim 11, wherein the non-depurating sound silencing elements define a flow channel for the exhaust gas.

15. A diesel engine according to claim 14, further comprising a flame arrester located in the body member upstream of the sound silencing elements that are installed therein so that it covers the flow channel.

16. A diesel engine according to claim 11, wherein each depurating sound silencing element installed in the hollow body member extends over substantially the entire cross-sectional area of the interior space.

17. A diesel engine according to claim 11, wherein two depurating sound silencing elements are located consecutively in the flow direction in the interior space of the hollow body member, and the body member has a mantle formed with apertures passing therethrough and opening between the two consecutive depurating elements so that compressed air can be fed therethrough for removing impurities deposited on the depurating elements during operation of the engine.

18. A diesel engine according to claim 15, wherein the mantle of the hollow body member is formed with additional apertures for removing impurities.

19. A silencer unit for an exhaust gas system of a large diesel engine, comprising:
   a hollow body member having an inner mantle surface that bounds an interior space, the body member having an exhaust gas inlet and an exhaust gas outlet, whereby exhaust gas is able to flow through the interior space of the hollow body member in a flow direction from the exhaust gas inlet to the exhaust gas outlet,
   bar-like guiding and support members at the inner mantle surface of the hollow body member,
   a plurality of sound silencing elements disposed in the interior space of the hollow body member, said sound silencing elements being supported relative to the hollow body member by said guiding and support members and being arranged in successive order in said flow direction and each extending over substantially the entire cross-sectional area of the interior space, whereby exhaust gas that flows through the hollow body member from the exhaust gas inlet to the exhaust gas outlet passes through the sound silencing elements consecutively, said elements being suitable for catalytic depuration of the exhaust gas by reaction with a catalytic depuration reagent in the exhaust gas.

20. A silencer unit according to claim 19, wherein the sound silencing elements are substantially cylindrical.

21. A silencer unit according to claim 19, wherein the hollow body member is substantially cylindrical and the sound silencing elements are substantially cylindrical and are disposed coaxially with the hollow body member.

22. A silencer unit according to claim 19, wherein the sound silencing elements are suitable for catalytic depuration of the exhaust gas by reaction with a catalytic depuration reagent that contains ammonia or urea.

23. A silencer unit according to claim 19, wherein the sound silencing elements are suitable for catalytic depuration of the exhaust gas by reaction of the exhaust gas with a catalytic depuration reagent to reduce the NOx content of the exhaust gas.

* * * * *